Figure 1:
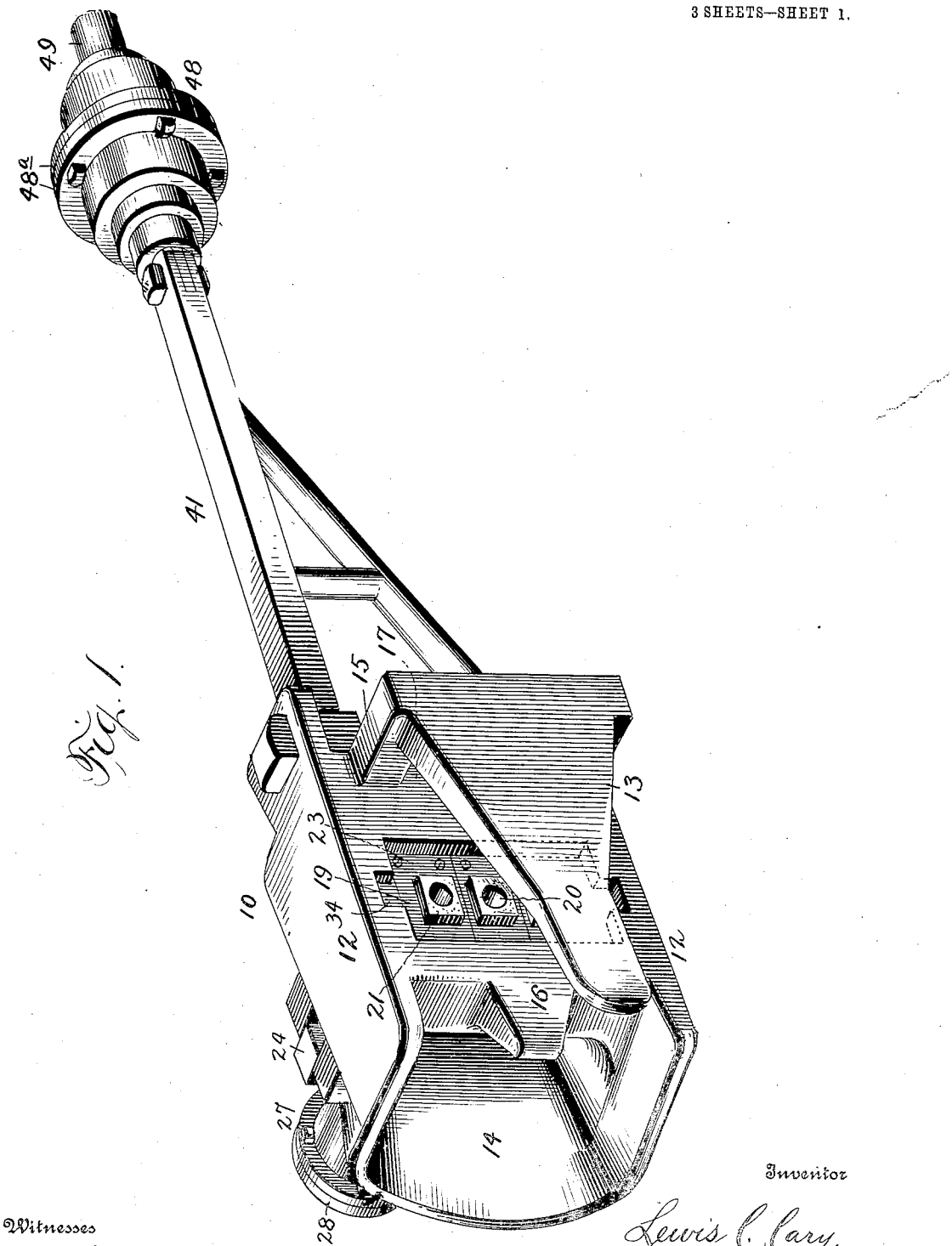

L. C. CARY.
AUTOMATIC TRAIN PIPE COUPLING.
APPLICATION FILED JULY 25, 1908.

930,041.

Patented Aug. 3, 1909.
3 SHEETS—SHEET 1.

Witnesses
A. B. Kent,
D. S. Allen.

Inventor
Lewis C. Cary.
By Chas. J. Williamson.
Attorney

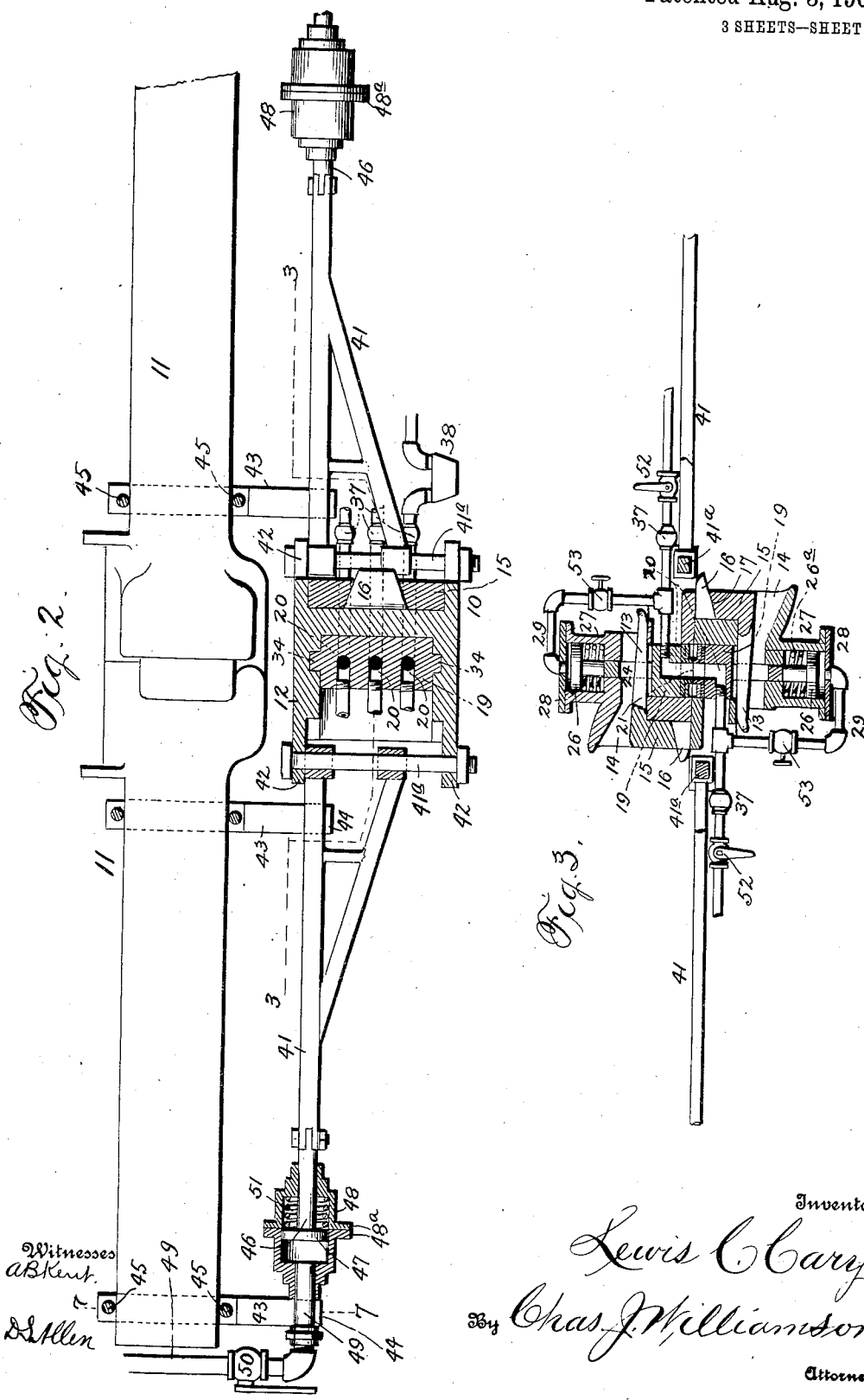

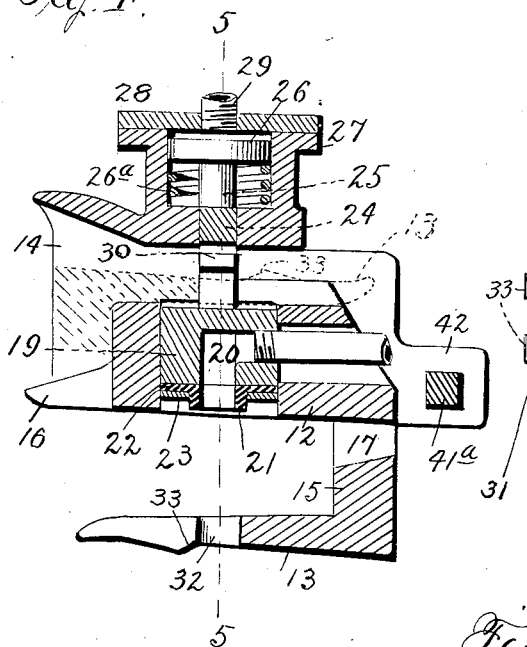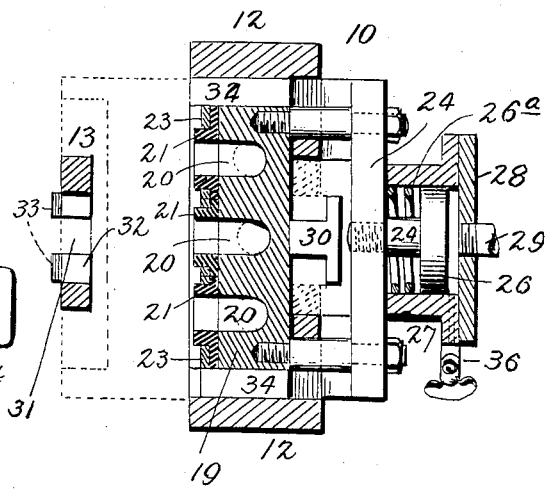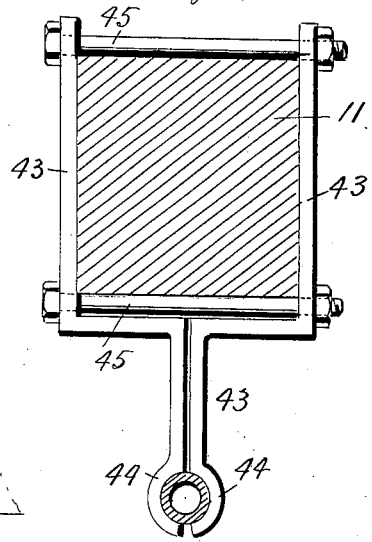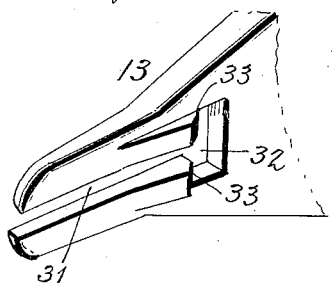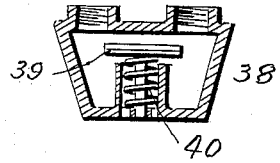

UNITED STATES PATENT OFFICE.

LEWIS C. CARY, OF LOS ANGELES, CALIFORNIA, ASSIGNOR TO L. C. C. AUTOMATIC COUPLERS COMPANY, A CORPORATION OF CALIFORNIA.

AUTOMATIC TRAIN-PIPE COUPLING.

No. 930,041.        Specification of Letters Patent.        Patented Aug. 3, 1909.

Application filed July 25, 1908.   Serial No. 445,350.

*To all whom it may concern:*

Be it known that I, LEWIS C. CARY, of Los Angeles, in the county of Los Angeles, and in the State of California, have invented a certain new and useful Improvement in Automatic Train-Pipe Couplers, and do hereby declare that the following is a full, clear, and exact description thereof.

A serious problem in railroading is the maintenance of an air tight joint in the air pipe couplings of adjacent cars of a train, because leakage of air, even though it may not amount to enough to brake the cars, may nevertheless cause such contact of the shoes with the wheels as to result in imposing an objectionable drag on the engine causing lost time to the train as well as needless wear. And this problem has been of especial moment and of difficult solution in the production of an automatic train pipe coupling, from the necessities of the case, both on account of the trying conditions developed from rounding curves, differences in the height of the car frames, etc., and the nature of the interlocking members of the coupling on opposing cars, which in their construction require, first of all, capacity for automatic or self-action.

The principal object of my invention therefore, has been to render possible of production and maintenance an air tight joint in train pipe couplings and particularly so in automatic couplings, and to do this without the employment of devices such as springs for holding the coupling members together, for spring-actuated devices have been found unreliable both in initially producing the necessary close contact of the coupling members and in maintaining such contact if made.
Moreover spring devices are objectionable in that they involve a complication of the structure that is undesirable in railroad appliances. By my invention, I utilize air pressure to move and hold the joint-forming members together and as it is possible to subject the parts to any pressure required, it will be evident that no difficulty whatever exists in the production and maintenance of an absolutely air-tight joint. Moreover, the use of air enables mechanism of an exceedingly simple character to be employed, even in an automatic coupling.

While principally designed for coupling the air pipes, I also utilize my invention for coupling the steam and signal pipes, one coupling in fact, for all the pipes being employed.

In the accompanying drawings—Figure 1 is a perspective view of one of the heads of an automatic train pipe coupling, embodying my invention; Fig. 2 is a view partly in side elevation, showing portions of two cars coupled together, and provided with my pipe coupling; Fig. 3 a horizontal section on line 3—3 of Fig. 2; Fig. 4 a similar view of one head, enlarged; Fig. 5 a section on line 5—5, of Fig. 4; Fig. 6 a detail view in perspective of a portion of one of the head arms; Fig. 7 a vertical section on line 7—7 of Fig. 2; Fig. 8 a detail view in section of the automatic valve for discharging water from the steam pipe.

In the embodiment of my invention which I show in the drawings, which is an automatic coupler, the equipment for all the cars, at both ends is exactly alike, so that there are no rights and lefts or male and female parts, to the end that the interlocking parts on two adjoining cars will be in proper co-operative relation regardless of which ends of the cars adjoin for coupling together. For each car, there is a coupling head 10 that is supported by or suspended from the car coupler 11, in the manner hereinafter described, which head comprises, in one casting a body 12, and on opposite sides, a forwardly projecting arm 13 and a forwardly opening chamber 14, the arm and chamber being complementary to the like members of the coupler head of another car, the arm of one head when the cars are coupled entering the chamber of the companion head. The arm is attached at its rear end to the body 12 by a web or wall 15, and from the latter it tapers forward, the taper being on both top and bottom and sides, and preferably the forward extremity of the arm is turned or bent outward slightly. This formation of the arm is to assure its entrance into the chamber 14 of the opposing coupler head, even under circumstances of considerable variation in alinement due to different heights of cars, and different lateral positions, and for the same reason, the forward end or mouth of the chamber 14 is flared horizontally and vertically, but at its inner end its bottom and top walls conform to the size and shape of the bottom and top edges of the forward portion of the arm 13 so that when the two coupler heads are in their final engaging position, there will be a rigid firm bearing of the arm and chamber walls. In order still more firmly to interlock and mutually support the two engaging coupler heads, the front end of the body 12 has a forwardly projecting doubly tapered or wedge-shaped finger 16, and in the arm-supporting wall or web 15 is a hole or slot 17 with rearwardly inclined, or converging sides into which the finger 16 of an engaging coupler enters and closely fits.

In the coupler head body 12 is a chamber or cavity which extends through it from side to side and slidingly fitting said cavity is a block 19 which is perforated to provide one or more ports 20, the number of ports agreeing with the number of train pipes to be coupled together, and which in the case of the coupler shown, is three, for air, signal and steam pipes, respectively. At the outer, or outlet end of each port, is a projecting gasket 21 which in the case of the air and signal ports can be of rubber, and in the case of the steam port is preferably of a composition containing graphite to withstand the action of the steam, and which, softening under the heat of the steam is maintained in a state that forms a perfectly tight joint. As I prefer to construct and apply the gaskets, each consists of a perforated block of the desired material having a flange 22 on all sides, which is secured to the block 19 by a thin plate 23 that overlies the flange 22, and through an opening in which the gasket body protrudes, said plate being secured to the block 19 by screws or bolts, but the gaskets may be otherwise attached to the block, if preferred. The arrangement described, however is a desirable one because the inside or extended bearing or support which is afforded the gasket, enables it to well support the pressure brought upon it without such displacement, as would tend to injure and rapidly destroy it and would add to the difficulty of forming a tight joint.

The port-carrying block 19 on its side opposite the gaskets has a laterally projecting shank 24 which plays in a slot in the walls of the chamber 14. The shank 24 has a hole or opening so located as to coincide with the chamber 14 for the passage of the arm 13 of the companion coupler. Beyond the side wall of the chamber 14 the shank 24 has a rod or stem 25, to which is secured a piston 26 in a cylinder 27 that projects horizontally from the outer side wall of the chamber 14. The cylinder 27 has its outer end closed by a removable head 28. Coupled to the head 28 is a pipe 29 that takes air from the air pipe line and leads it to the cylinder 27 to act upon the piston therein and thereby move the port-carrying block to project the gaskets 21 beyond the face of the coupler body 12 and into joint-forming contact with the gaskets 21 of an opposing coupler head. To move the piston in the opposite direction when the air pressure is off, and so to retract the port-carrying block to place the protruding portions of the gaskets entirely within the block cavity I interpose a coil spring 26$^a$ between the piston and the end of the cylinder next the outer side wall of the chamber 14. It is important to have the gaskets thus retracted during a coupling and an uncoupling operation because of the damage to them that would occur by collision and the rubbing contact of the gaskets of one coupler head and those of another coupler head. As a matter of precaution, to prevent injury to or destruction of the gaskets by the accidental breaking apart of two cars, I may provide means in addition to the spring 26$^a$ to automatically retract the port-carrying block 19 by the movement of the coupler heads when separating. Said means as shown in Figs. 4 to 6, may consist of a headed lug or button 30 on that side of the block 19 which adjoins the chamber 14, and situated in the path of the arm 13 of the coöperating coupler head, and a slot or channel 31 in the arm through which passes the button shank, which terminates in an opening or hole 32 of sufficient size for the button head to pass through when the head and hole aline, and the surface of the arm next the button head being inclined at 33 to act on the head as the arm moves outward in uncoupling and thereby, by a camming action retract the gasket-carrying block 19. As the incline 33 is arranged to act at once when the outward movement of the arm 13 begins, the disengagement of the gaskets of the two coupled heads will occur instantaneously. Preferably the port-carrying block 19 has at top and bottom a guiding lug 34, which engages a groove in the body 12.

To prevent the cylinder 35 being air bound, it is provided with a bleeding cock 36.

If desired the connections between the ports in the port-carrying block 19 and the pipes may be the ordinary flexible hose connections, but I prefer to use all-metal pipe connections and I provide for the necessary flexibility required by the movement of the coupler head relative to the pipes by employing a ball and socket connection 37 at suitable points in each pipe that runs to a port. By using all metal connections, the danger of leakage by accidental puncture or cutting of the ordinary flexible hose is obviated.

In order to automatically remove water of condensation from the steam pipe, I provide in the latter a trap 38, in the form of a downward bend or box in which is placed a valve 39 that is normally held open by a spring 40, when there is no steam pressure in the pipe, and it closes by the pressure of the steam upon it. When there is no steam in the pipe the valve being open, any water of condensation in the steam pipe will escape.

Connected to the inner or rear end of the coupler body 12, and extending rearwardly therefrom, is a beam or bracket 41 comprising a horizontally extending member, and a downward and forwardly inclined bracing member, both of which members have their forward ends formed into sockets, that are rectangular in cross-section and slidingly fit a correspondingly-shaped post or bolt 41$^a$ that is secured to rearwardly projecting ears 42, at the top and bottom respectively of the coupler body 12. The distance between the beam sockets is sufficiently less than the length of the bolt or post between its supporting ears to allow an up and down or vertical movement of the coupler head with reference to the beam, such vertical movement of the coupler head being necessary in order to allow for the differences in the height of car bodies. The beam 41 constitutes the means for supporting the coupler head, from the car, and I preferably so support the coupler head from the draw bar directly beneath the car coupler. The attaching and supporting means that I employ, consists of clamps that are bolted to the draw bar of the coupler, each clamp being composed of two similar straps 43 that engage opposite sides of the draw bar and extend beneath the same, and having beam-engaging fingers 44, bolts 45 being used above and below the draw bar to draw together and hold the straps by a clamping action on the draw bar, and by this mode of attaching my train pipe coupler to the car coupler, nothing needs to be done to the car coupler in order to enable my invention to be utilized with it, a thing of especial importance in that it enables the easy and inexpensive application of my invention to cars, already equipped with car couplers and also the employment thereof with cars being constructed, without requiring any alteration of the car couplers now manufactured and applied to cars.

At the inner end of the horizontal member of the beam 41 is a piston rod 46 on which is a piston 47, fitting a cylinder 48, which on the side of the piston opposite the beam is connected by a pipe 49 to the train line, air from which acting upon the piston in the cylinder, moves the piston forward, and through the beam connection between the piston and coupler head, moves the latter forward. A valve 50 is provided in the pipe 49 to cut off the supply of air to the piston when necessary. To move the piston and, in consequence, the coupler rearward, a coil spring 51 is interposed between the piston and the head of the cylinder opposite the air side of the piston, and the length of the cylinder and the extent of the travel of the piston are such, preferably, that when the coupler head is retracted by the action of the spring, the forward end of the coupler head will be to the rear of the forward end of the car coupler, so that if by accident, in coupling the cars the couplers should miss, which might happen when the cars are on a curve, there will be no collision between or striking together of the train pipe coupling heads of the cars, which might seriously damage or injure them. It will be understood that no air would be acting on the pistons under the conditions just referred to, and it would be necessary to open the valve 50 in the air pipe connection 49 after the train pipe coupler heads are engaged in order to utilize the air pressure to press and hold the connecting heads in proper engaging position, under all conditions of movement backward and forward of the coupler heads with reference to the cars on which they are mounted. Should it be desired to subject the piston 47 in the case just mentioned only to atmospheric pressure, the valve 50 may be a three-way valve, or other provision made for establishing communication between the cylinder 48 and the external air. If preferred, however, the valve 50 may either be dispensed with, or left open at all times, so that normally the coupler head will be pressed and yieldingly held in its most forward position at the time coupling is to take place, so that the shock of the coming together of the coupler heads will be sustained by the air cushion which exists in the cylinder 48. The retraction of the train pipe coupler head in rear of the vertical plane of the front of the car coupler is of more particular importance in freight car service, where, in making up trains, the cars are shifted about with such heedlessness and violence that the collision of the pipe coupler heads with one another is apt to cause them serious damage. It will be evident that the operation of turning on the valves 50 of the cars of a train after the cars are coupled is but a simple matter.

The cylinder 48 may be very cheaply made by casting it in duplicate halves with integral cylinder heads and provided with flanges 48$^a$ at mid-length for fastening-screws or bolts, only that half in which the piston works being required to be machined. Thus cast in duplicate halves, but a single pattern is necessary.

The air brake pipe leading to the port thereof in the port-carrying head 19 is, as usual, provided with an angle-cock or any other style of cock 52 for opening or closing the air pipe which cock 52, of course, is opened when the train pipe coupler heads are interlocked, and said cock 52 is so located as to control the supply of air to the piston 26, which moves the port-carrying block 19 so that simultaneously with the opening of the air pipe by the cock 52, to place the air pipes of two cars in communication through the coupler heads, air is admitted to the cylinder 27 to act upon the piston 26 to force the gaskets of the respective coupler heads into joint-forming contact. Preferably the amount of movement of the port-carrying head 19 is sufficient to carry the gaskets of the opposite head into joint-forming contact with the gaskets of the opposite head, when wholly retracted within the body or chamber or cavity 18, this amount of movement of the port-carrying head being provided to make unnecessary the simultaneous opening of the cock 52 on both cars for the production of air tight joints between the gaskets of adjoining coupler heads.

It is to be observed that the ports of my coupler head are so arranged and located, that they come together in a plane that extends longitudinally of the cars, and not one that extends transversely of the cars, their engagement being what is known as a side engagement, and not a front engagement. A side engagement is desirable in order to maintain a tight joint when the cars are passing around a curve, because with the side engagement, it is possible for the joints between the gaskets to be opened by the sidewise or lateral movement in adjoining cars in passing around a curve.

A train pipe coupler head constructed in accordance with my invention, embodies all those features of construction that experience has shown are essential to meet the varied and trying conditions which exist in railroad practice, and above all, a coupler embodying my invention in using air as a means for producing and maintaining contact of the joint-forming surfaces of a coupler head as well as for maintaining the engaging coupler heads in proper relative position, meets them with a structure of such simplicity, that it can always be depended upon to operate, and is not easily deranged or gotten out of order.

I have been particular to illustrate and describe in detail, a train pipe coupler embodying my invention in order to fully and clearly herein disclose my invention, but it is to be undertsood that I do not restrict the scope of my patent to a coupler having the particular construction and arrangement of parts herein shown and described, because changes in construction may be made, as well in the omission of some parts as in the change of others, as will nevertheless result in a coupler embodying my invention.

Preferably, a valve 53 will be placed in the air pipe leading to the cylinder 27 to enable air to the latter to be cut off at will, and instead of having the angle-cock 52 to control simultaneously air to the air port 20 and the cylinder 27, the angle-cock 52 can be located in the air pipe beyond the point where the branch pipe leads to the cylinder.

Having thus described my invention what I claim is—

1. A train pipe coupler having a head with a port provided with a joint-forming surface through which the port passes, and movably mounted on said head, and fluid-pressure actuated means comprising a cylinder and piston mounted on the head acting to press such surface against an opposing joint-forming surface, said fluid pressure being the sole means for moving said joint-forming surfaces into contact.

2. A train pipe coupler having a head with a port provided with a joint-forming part through which the port passes, and movably mounted on said head, and fluid-pressure actuated means comprising a cylinder and piston mounted on the head, and direct connections between the piston and said joint-forming part, said fluid pressure being the sole means for moving said joint-forming surfaces into contact.

3. A train pipe coupler having a head, a block having a port provided with a joint-forming surface through which the port passes, and movably mounted on said head, a cylinder mounted on said head, a piston in said cylinder, connected with said movable block, and means for supplying fluid pressure to said piston, said fluid pressure being the sole means for moving said joint-forming surface into contact.

4. A train pipe coupler having a head with a port provided with a joint-forming surface through which the port passes, and movably mounted on said head, a cylinder mounted on said head, a piston in the cylinder connected with said movable joint-forming surface, and valve-controlled means for supplying fluid under pressure to said piston and to said port, said fluid pressure being the sole means for moving said joint-forming surfaces into contact.

5. A train pipe coupler having a head, a port-carrying member with a joint-forming surface through which the port passes, and movably mounted on the head, and a fluid-pressure receiving piston directly connected with said member and mounted on the same head, said fluid pressure being the sole means for moving said joint-forming surface into contact with the opposing joint-forming surface.

6. A train pipe coupler having a head, a port-carrying block movably mounted in a chamber in the head, a fluid-pressure receiving piston mounted in the head on one side of said block, and a rigid arm on the head on the opposite side of the block adapted to be engaged by the head of a coöperating coupler, toward which said port-carrying block is moved by the movement of the piston under fluid pressure.

7. A train pipe coupler having a head, a port-carrying member movably mounted in said head having a joint-forming surface through which the port passes, a fluid-pressure receiving piston connected with said member, the movement of said piston under fluid pressure being the sole means for moving the member to place its joint-forming surface in contact with a similar joint-forming surface, and a fluid-pressure actuated piston connected with the head.

8. A train pipe coupler having a head, a movable port-carrying member having a joint-forming surface, a fluid-pressure operated piston mounted on the head, direct connections between said piston and said member, the movement of said piston under fluid pressure being the sole means for moving the member to place its joint-forming surface in contact with a similar joint-forming surface, and a fluid-pressure actuated piston connected with the head.

9. A train pipe coupler having a head with a port-carrying member with a joint-forming surface through which the port passes and movable transversely of the head, a fluid-pressure receiving piston connected with said member, the movement of said piston under fluid pressure being the sole means for moving the member to place its joint-forming surface in contact with a similar joint-forming surface, the head being movable longitudinally, and a fluid-pressure actuated piston connected with said head.

10. In a train pipe coupler, the combination of a head, a port-carrying block movably mounted in the head, and means to move said block to place a joint-forming surface thereof within the head and hold it there when the head is uncoupled from a companion head.

11. In a train pipe coupler, the combination of a coupler head, a port-carrying block movable transversely of said head and having a joint-forming surface adapted to project beyond the plane of the side surface of the head when the coupler is in a coupled position, and means to move said block to place and hold said joint-forming surface within the head when the head is in an uncoupled condition.

12. In a train pipe coupler, the combination of a coupler head having an arm and an arm-receiving chamber, a port-carrying block movable transversely of said head, having a joint-forming surface that projects beyond the plane of the side of the head in a coupled condition, and co-acting parts on the arm of one head and the block of a companion head to move the block to place its joint-forming surface within the head.

13. In a train pipe coupler, the combination of similar heads having complementary engaging parts, means supporting each head from a car coupler in position in readiness to co-act with the other head, a port-carrying block movably mounted in a chamber in each head, extending transversely thereof, a fluid-pressure receiving piston mounted on said head, connections between said piston and said port-carrying block, and means to supply air to the piston and to the port of the port-carrying block independently.

14. In a train pipe coupler, the combination of similar heads having complementary engaging parts, means supporting each head from a car coupler in position in readiness to co-act with the other head, a port-carrying block movably mounted in a chamber in each head extending transversely thereof, a fluid-pressure receiving piston mounted on said head, connections between said piston and said port-carrying block, and means to supply air to the piston and to the port of the port-carrying block independently.

15. In a train pipe coupler, the combination of similar heads having complementary engaging parts comprising a chamber and an arm in each head, means supporting each head from a car coupler in position in readiness to co-act with the other head, a port-carrying block movably mounted in a chamber in each head extending transversely thereof, a fluid-pressure receiving piston mounted on said head, connections between said piston and said port-carrying block extending across the arm-receiving chamber of the head, and means to supply air to the piston and to the port of the port-carrying block.

16. In a train pipe coupler, the combination of a coupler head, a supporting beam therefor, and a vertically slidable connection between the head and the beam, whereby the head may move up and down relative to the beam, said connection comprising a pair of separated sockets on the beam, and a post on the head engaged by said sockets.

17. In a train pipe coupler, the combination of a draw bar, a train pipe coupler head, a beam, and a clamp connecting the beam and draw bar, comprising a pair of straps that engage opposite sides of the draw bar and the beam, and bolts connecting the straps situated between the draw bar and the beam and above the draw bar.

18. In an automatic train pipe coupler, the combination of a body-portion, an arm upon one side of the body, a chamber on the opposite side of the body, said arm and chamber being adapted to correspond with a chamber and arm of an opposing coupler, a cavity or opening with inclined sides in the body, and a finger with inclined surfaces at the front end of the body adapted to engage the walls of the cavity or opening in an opposing coupler.

19. In a train pipe coupler, the combination of a coupler head, having a movable port-carrying member, means yieldingly holding said member with a portion projecting beyond the side of the coupler head, and a projection on said member adapted to be engaged by a coöperating part on an opposing coupler to produce movement of said member in opposition to said yieldingly holding means.

20. In an automatic train pipe coupler, the combination of a coupler head, a piston connected with the head, and a cylinder containing the piston formed of duplicate sections, having each an integral head, and the two sections joined at the longitudinal center.

In testimony that I claim the foregoing I have hereunto set my hand.

LEWIS C. CARY.

Witnesses:
   CHAS. J. WILLIAMSON,
   J. RAYMOND HOOVER.